(No Model.)

R. A. JOHNSON.
CULTIVATOR.

No. 248,471.  Patented Oct. 18, 1881.

UNITED STATES PATENT OFFICE.

RICHARD A. JOHNSON, OF NEWNAN, GEORGIA.

CULTIVATOR.

SPECIFICATION forming part of Letters Patent No. 248,471, dated October 18, 1881.

Application filed July 28, 1881. (No model.)

*To all whom it may concern:*

Be it known that I, R. A. JOHNSON, of Newnan, in the county of Coweta and State of Georgia, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators which are used especially for the cultivation of cotton; and it consists in making the guard-wing which prevents the dirt from falling upon the plants adjustable to different angles, according to the shape of the bed or the state of the plants that are being cultivated.

This invention is intended as an improvement upon the patents heretofore granted to me, and differs from them in having the guard made adjustable instead of being fastened rigidly in place. The object in making this guard adjustable is to adapt it to cutting away the side of the bed on a gradual slope without exposing the roots of the plants in such a manner that they will be injured, as is the case where the guard has no adjustability and is bent upon itself at right angles.

Figure 1:
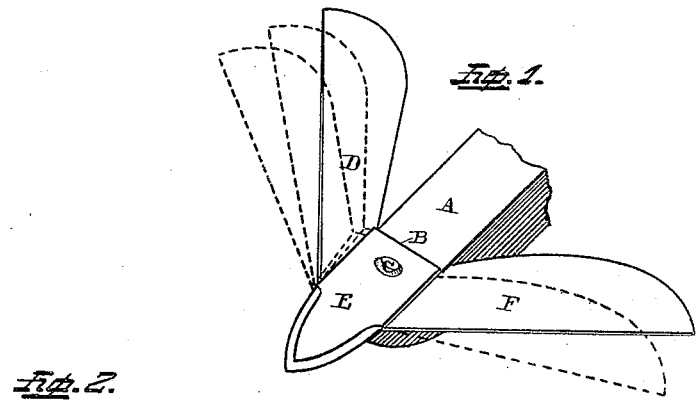
Figure 2:
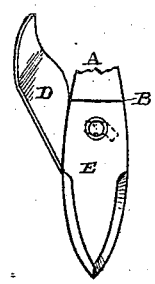
Figure 3:
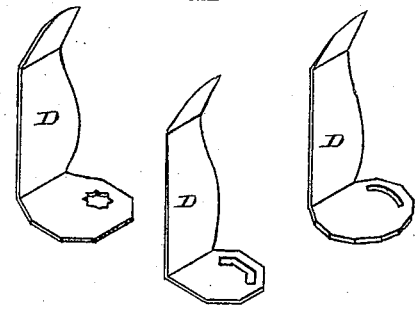
Figure 4:
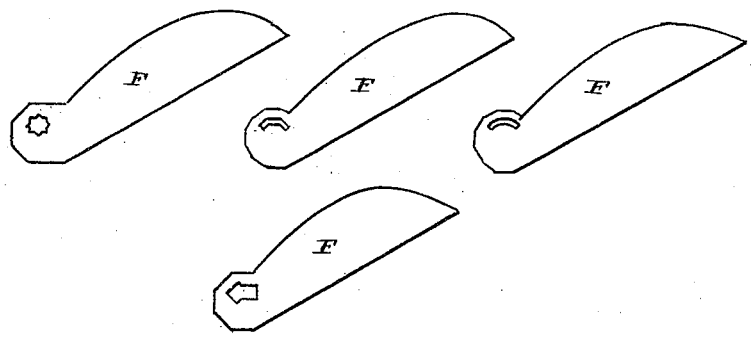

Figure 1 is a front elevation of my invention. Figs. 2 and 3 are perspectives of the guard alone. Fig. 4 shows different forms of wings which may be used in connection with my adjustable guard.

A represents the standard, which is provided with the shoulder B near its lower end. To this standard are attached, by means of the single bolt C, the guard D, the cultivator-point E, and the wing F. So far as the cultivator-point and the wing are concerned, they may be constructed as shown in either one of my former patents, as no special claim is here made for them. The wings may be made adjustable by means of an angular hole, slots, or any other means which may be preferred.

In the patents heretofore granted to me the guard has been shown as bent upon itself at a right angle and rigidly secured to the standard. This form of guard has been found to be objectionable, because it would run close to the plants, and, cutting a square shoulder or slice from the bed, would leave the roots exposed, and the plants would frequently fall over. To obviate this trouble I now curve the guard, as here shown, so as to extend gradually toward the plants, and instead of rigidly attaching it to the standard, as heretofore, I make it adjustable by means of holes, slots, or other devices, either similar to what is used for adjusting the wings, or any other that may be preferred. If the slots or holes, such as are here shown, in the wings, are used, the top edge of the guard will have a shoulder or angle corresponding to each adjustment that is provided for in the slot or hole. By thus making the guard adjustable it cuts a slant or slope upon the side of the bed, and thus prevents the dirt from being cut away from the roots in such a manner as to cause the plants to be injured. By adjusting this guard the angle of the slope can be increased or decreased at will, as may be found necessary. Where both the guard and the wing are thus made adjustable, the growing plants can be cultivated to a better advantage and with more safety than has heretofore been possible.

Having thus described my invention, I claim—

The combination of the standard A, having the shoulder B, the cultivator-point, the adjustable wing, the bolt, and the curved adjustable guard, the guard having an adjustment of its own independently of the wing, substantially as shown and described.

In testimony whereof I affix my signature in presence of two witnesses.

RICHARD A. JOHNSON.

Witnesses:
  THOS. E. FELL,
  W. A. MITCHELL.